(12) United States Patent
Currat et al.

(10) Patent No.: US 10,758,991 B2
(45) Date of Patent: Sep. 1, 2020

(54) AUTOMATIC SHARPENER FOR CHAIN-SAW CHAIN

(71) Applicant: Usines Métallurgiques de Vallorbe SA, Vallorbe (CH)

(72) Inventors: Claude Currat, Les Cullayes (CH); François Galloppini, Pully (CH); Kevin Bernard, Montagny-La-Ville (CH); Xavier Greppin, Crissier (CH)

(73) Assignee: Usines Métallurginques de Vallorbe SA, Vallorbe (CH)

( * ) Notice: Subject to any disclaimer, the term of this patent is extended or adjusted under 35 U.S.C. 154(b) by 0 days.

(21) Appl. No.: 16/469,295

(22) PCT Filed: Dec. 13, 2017

(86) PCT No.: PCT/IB2017/057894
§ 371 (c)(1),
(2) Date: Jun. 13, 2019

(87) PCT Pub. No.: WO2018/109686
PCT Pub. Date: Jun. 21, 2018

(65) Prior Publication Data
US 2020/0101544 A1    Apr. 2, 2020

(30) Foreign Application Priority Data

Dec. 13, 2016  (CH) ........................................ 1641/16
Jul. 17, 2017  (WO) .................. PCT/IB2017/054299

(51) Int. Cl.
*B23D 63/16* (2006.01)
(52) U.S. Cl.
CPC .................................. *B23D 63/162* (2013.01)

(58) Field of Classification Search
CPC .. B23D 63/162; B23D 63/166; B23D 63/164; B23D 63/16; B27B 17/08; B27B 17/02; B27B 3/368; B26D 63/168; B26D 63/005
(Continued)

(56) References Cited

U.S. PATENT DOCUMENTS

| 5,241,882 A * | 9/1993 | Eriksson | B23D 63/162 33/202 |
| 7,900,536 B2 * | 3/2011 | Hensley | B24B 3/368 30/381 |

(Continued)

FOREIGN PATENT DOCUMENTS

DE      102010034197      3/2011

OTHER PUBLICATIONS

International Search Report and Written Opinion issued by the International Bureau of WIPO, dated Apr. 12, 2018, for International Patent Application No. PCT/IB2017/057894; 9 pages.
(Continued)

*Primary Examiner* — Ghassem Alie
(74) *Attorney, Agent, or Firm* — Faegre Drinker Biddle & Reath LLP

(57) ABSTRACT

The invention relates to an automatic sharpener for cutting teeth of a chain-saw chain of the type that has links and cutting teeth comprising a depth gauge. The sharpener comprises a receiving region comprising a chain support that can receive a chain-saw chain of the above-mentioned type, a driving means allowing a preferably automatically regulated horizontal translation, forwards and in stages, of said chain-saw received in the receiving region, a sharpener means arranged so as to sharpen the cutting teeth at different sharpening angles, after each translation of a chain-saw chain, and a means for planing the depth gauge of a cutting tooth, the planing means and the sharpening means each (Continued)

comprising a flat file and a round file which are detachably secured in a file carrier.

16 Claims, 7 Drawing Sheets

(58) Field of Classification Search
USPC .......... 76/80.5, 25.1, 82–89, 36, 31, 32, 38; 30/181, 383–387, 453, 138–139, 381; 83/174
See application file for complete search history.

(56) References Cited

U.S. PATENT DOCUMENTS

| | | | | |
|---|---|---|---|---|
| 8,291,790 B2* | 10/2012 | Schlimbach | ......... | B23D 63/162 |
| | | | | 407/29.15 |
| 8,950,073 B2* | 2/2015 | Martinsson | .......... | B23D 63/168 |
| | | | | 30/138 |
| 9,186,737 B2* | 11/2015 | Martinsson | .......... | B23D 63/005 |
| 10,265,788 B2* | 4/2019 | Lynn | .................... | B23D 63/166 |

OTHER PUBLICATIONS

International Preliminary Report on Patentability issued by the International Searching Authority, dated Jun. 27, 2019, for International Patent Application No. PCT/IB2017/057894; 6 pages.

* cited by examiner

AUTOMATIC SHARPENER FOR CHAIN-SAW CHAIN

CROSS-REFERENCE TO RELATED APPLICATIONS

The present application is a national stage entry of International (PCT) Patent Application Number PCT/IB2017/057894, filed Dec. 13, 2017, which in turn claims priority to Swiss Patent Application No. 01641/16, filed Dec. 13, 2016 and International (PCT) Patent Application Number PCT/IB2017/054299, filed Jul. 17, 2017, the subject matter of which are expressly incorporated herein by reference.

The present invention relates to an automatic sharpener for cutting teeth of a chainsaw chain.

The grinding of the chainsaw chains is performed mainly in three different ways. A first manual method, usable anywhere and especially at the cutting location, is carried out by means of a round file. This first method has the advantage of not being dependent on a source of energy because this grinding is performed by hand. In addition, this first method does not alter the hardness of the cutting teeth, thus ensuring a perfect cutting throughout the life of the chainsaw chain.

A second manual method is carried out, mainly in a workshop, by means of a manually operated disk grinding wheel. This second method can be carried out by different models of machines and grinding wheels. This method requires disassembly of the chainsaw chain. The grinding is more accurate but not faster than the manual method with the round file, however the abrasive grinding wheels used, because of their rotational speeds, lead over time to a deterioration of the cutting teeth of the chainsaw chain. This has the effect of reducing the performance of the chainsaw in the field. In addition, this second method has the disadvantage of having to manually move and position the links under the grinding wheel.

The third method, fully automatic, is carried out by means of an abrasive disk, where the grinding of the cutting teeth of the chainsaw is performed without human intervention, the progress of these teeth being done automatically. This more expensive solution has the same disadvantage associated with the use of a disc grinding wheel.

Various devices in relation to automatic grinding are known from the state of the art. Document WO2011023162A1 describes a device for automatically grinding saw chains and a corresponding method, the saw chains having teeth and being possibly equipped with depth limiters. According to document WO2011023162A1, the grinding of the teeth and/or the adaptation of the depth limiters of the saw chain are performed entirely automatically by means of a file. The disadvantage of this device is that it is bulky and requires a mains supply. Furthermore, this embodiment, in addition to not being operational for an embodiment in production since too complex to develop and which, for grinding and sharpening the same saw tooth, requires several successive operations.

Document EP0690759 describes arrangements relating to automatic chainsaw chain grinders, of the type comprising a chain support and elements for the stepwise-regulated supply of a row of cutting chainsaw chain links, both for chains of the left cutting type and for those of the right cutting type, to a predetermined grinding location on said chain support. Document EP0690759 also describes a grinder, movable relative to the chain support and automatically controlled by these elements, used to grind the cutting edge of a cutting link positioned in the grinding location. This grinder is arranged to grind, in a first position, right links, and in a second position, left links.

Document WO1999038638A1 describes a chain saw sharpener and a chain saw equipped with such a sharpener, whose surface of the bottom teeth of the chain usually sharpened from the bottom is automatically sharpened while the chain, driven by its motor, passes on the sharpener. The sharpening is performed without having to remove the chain from its tensioner. The sharpener is preferably mounted reversibly on a flange, itself reversibly mounted on the saw. The sharpener includes a tooth, placed in a casing fixed to the tensioner, and whose upper surface rubs against the lower surface of the teeth of the rotating chain.

The aim of the present invention is to provide a sharpener for an accurate automatic grinding in a workshop or in the field without the problems associated with heating, and without alteration of the cutting teeth.

According to the invention, a sharpener allows automatic grinding for cutting teeth of a chainsaw chain of the type including links and cutting teeth including a depth limiter. The sharpener includes an accommodation area comprising a chain support able to receive a chainsaw chain of the aforementioned type, the longitudinal axis of the accommodation area defining a first horizontal direction, the median plane of the chain parallel to the lateral surfaces of the links defining a vertical plane. The sharpener includes a drive means for a horizontal translation preferably an automatically forward and stepwise-regulated supply of the chainsaw chain received in the accommodation area. The sharpener further includes a sharpening means arranged to sharpen the cutting teeth at different sharpening angles, after each translation of a chainsaw chain, and a means for planing the depth limiter of a cutting tooth, the planing means and the sharpening means respectively comprising a flat file and a round file removably fixed in a file holder. The sharpening means and the planing means are arranged to simultaneously sharpen and plane the same cutting tooth in a linear and reciprocating movement of the file holder in a plane comprised between +/−10° relative to the first horizontal direction. The automatic sharpener further includes a means for vertically positioning the file holder, arranged to exert, in the vertical direction, a planing pressure of the flat file on the cutting tooth during the linear and reciprocating movement of the flat file simultaneously with the linear and reciprocating movement of the round file.

In one embodiment, the file holder comprises a means for adjusting the vertical distance between the axis of the round file and the main plane of the flat file.

In one embodiment, the sharpener is arranged in such a way that the vertical positioning means contains an electric motor and is arranged to adjust the planing pressure according to the intensity of the electric current flowing in this motor.

In one embodiment, the means for vertically positioning the file holder is arranged to exert a planing pressure which is decreased at least during a final period of linear and reciprocating movement.

In one embodiment, the horizontal positioning means contains an electric motor and is arranged to adjust a sharpening pressure on the round file according to the intensity of the electric current flowing in this electric motor.

According to this embodiment, the means for horizontally positioning the file holder is arranged to exert a sharpening pressure which is decreased at least during a final period of linear and reciprocating movement.

In one embodiment and to obtain a better cutting performance, the file holder is arranged to move in translation at a leading angle of the planing and sharpening means on the tooth comprised between +/−10 degrees relative to the first horizontal direction.

Preferably, the leading angle is at least of +/−1 degree and therefore always different from zero.

In one embodiment, the sharpener includes a means for adjusting the file holder, arranged to be positioned in grooves disposed parallel to the file holder, each groove being of different depth each corresponding to a determined value of the vertical distance between the axis of the round file and the main plane of the flat file.

Preferably, the sharpener includes holding means arranged to hold a chainsaw chain during sharpening and planing operations, said holding means including in particular a stop finger.

In one embodiment, the sharpener includes a file guide, which guides the file holder in translation, by means of a rack system driven by a stepper motor.

The automatic sharpener must be able to sharpen each chainsaw chain according to its characteristics, control means are advantageously arranged to select a pitch of teeth, a number of teeth, a profile of teeth, a function of sharpening a cutting tooth and a function of planing a depth limiter of a cutting tooth of a chainsaw chain. Thus, for a simplified navigation through the choice of the features, the sharpener further includes a digital display, in particular an LCD display for displaying the information of the control means. Such automatic management of the grinding of a chain is possible thanks to the control means that include in particular a microcontroller arranged on an electronic card.

In one embodiment, the sharpening and planing means are split and disposed on either side of the chain support, so as to act concomitantly or successively on a left cutting tooth and a right cutting tooth of a chainsaw chain of the type with alternating links.

In another embodiment, the sharpening and planing means are mounted on a pivotable support between two symmetrical positions, so as to act successively on all the left cutting teeth and all the right cutting teeth of a chainsaw chain of the type with alternating links, without having to return the chain in its chain support.

According to this other embodiment, the sharpener for sharpening a chain including cutting teeth provided with a roof-shaped portion includes detection means arranged to detect said roof-shaped portion with the smallest height so as to determine a reference point for uniformly sharpening all the other roof-shaped portions of the cutting teeth of a chainsaw chain.

In use, the wear of a cutting tooth of a chainsaw chain can be detected by a user who would himself/herself determine the settings to be made on the automatic sharpener control means.

The chain drive means, the sharpening means and the planing means may in particular be driven by stepper motors or a pneumatic system.

The characteristics of the invention will appear more clearly upon reading the description of several embodiments which are only illustrative and in no way restrictive, with reference to the schematic figures, in which.

Figure 1:
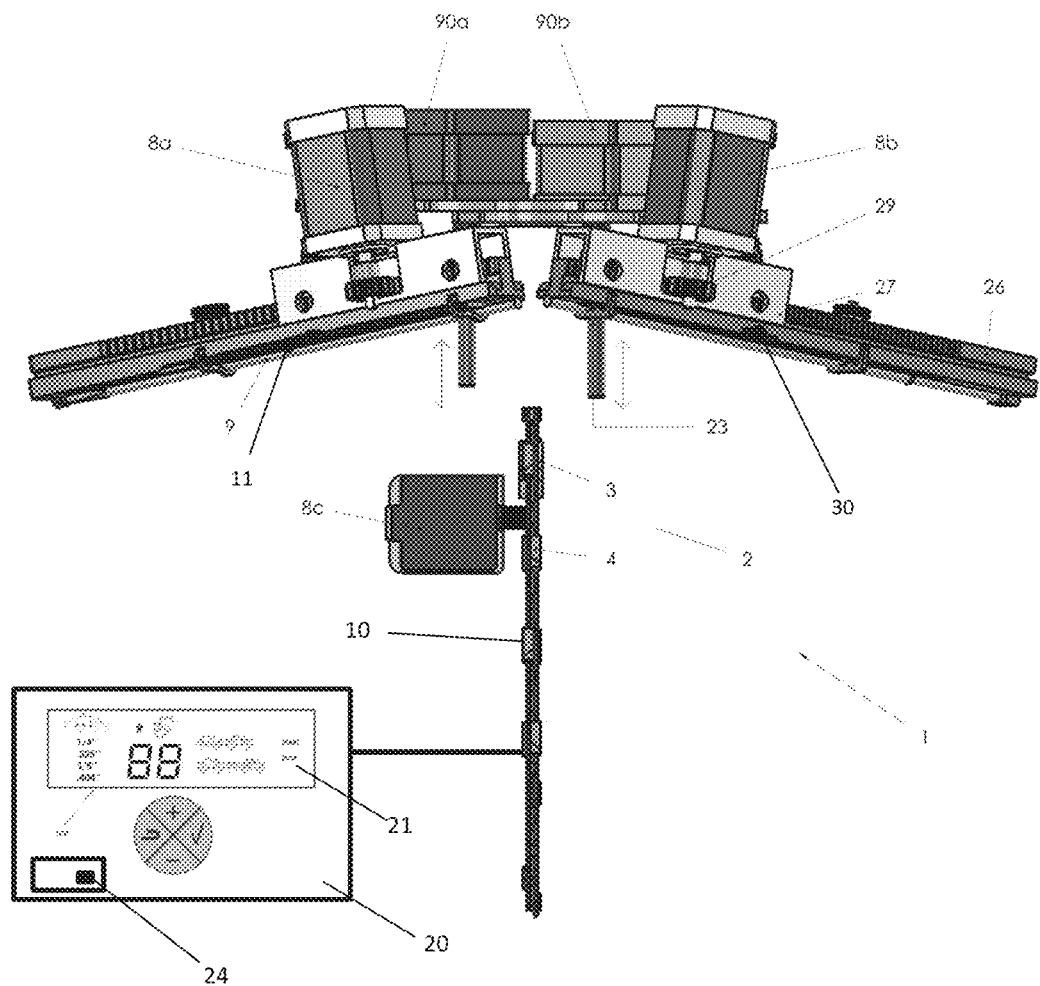
FIG. 1 represents a schematic front view of an automatic sharpener.
Figure 6:
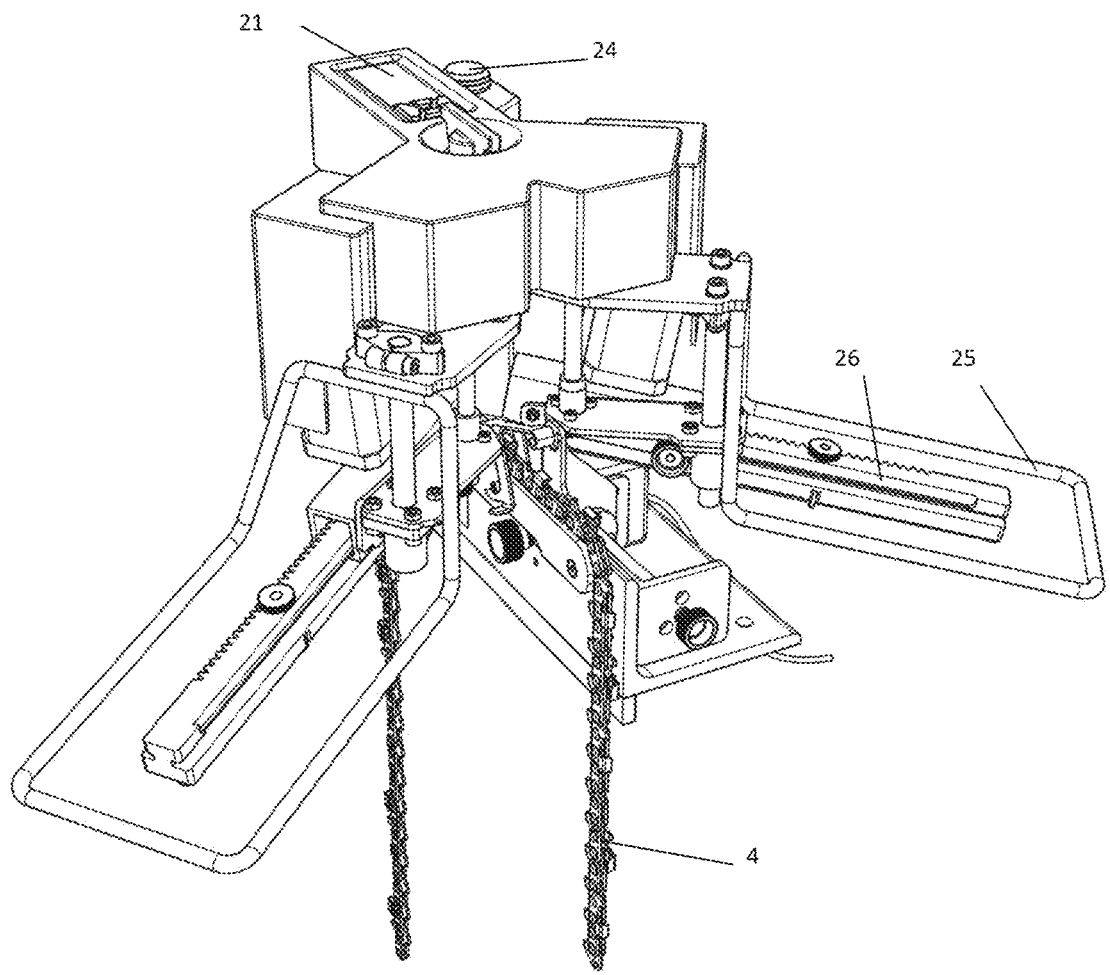
FIG. 6 represents a perspective view of the sharpener according to the present invention.

FIG. 1 and FIG. 6 illustrate an automatic sharpener 1 for cutting teeth of a chainsaw chain 4 of the type including links and cutting teeth including a depth limiter. The sharpener includes an accommodation area 2 comprising a chain support 3 able to receive a chainsaw chain 4 of the aforementioned type, the longitudinal axis of the accommodation area 2 defining a first horizontal direction. The median plane of the chain parallel to the lateral surfaces 32 (FIGS. 9 and 10) of the links define a vertical plane. The sharpener includes a stepper motor 8c allowing an automatically forward-regulated and stepwise-regulated horizontal translation of said chainsaw chain 4 received in the accommodation area 2. The sharpener further includes a sharpening means 9 arranged to sharpen the cutting teeth 10 at different sharpening angles, after each horizontal translation of a chainsaw chain 4, and a planing means 11 (FIG. 10) of a depth limiter 14 (FIG. 9) of a cutting tooth 10. The planing means 11 (FIGS. 6 and 10) and the sharpening means 9 comprise respectively a flat file and a round file removably fixed in a file holder 26 (see FIG. 7A).

In this example, the sharpening means 9 and the planing means 11 are arranged to simultaneously sharpen and plane the same cutting tooth 10 according to a linear and reciprocating movement of the file holder 26 in an inclined plane of about 10°.

Figure 2:
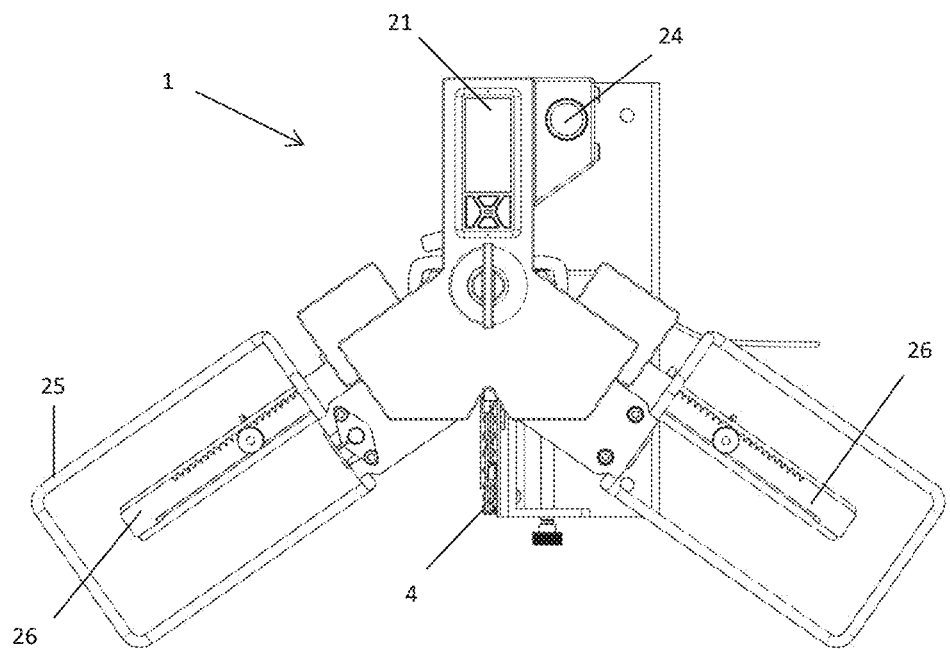
FIG. 2 represents a top view of an automatic sharpener.
Figure 3:
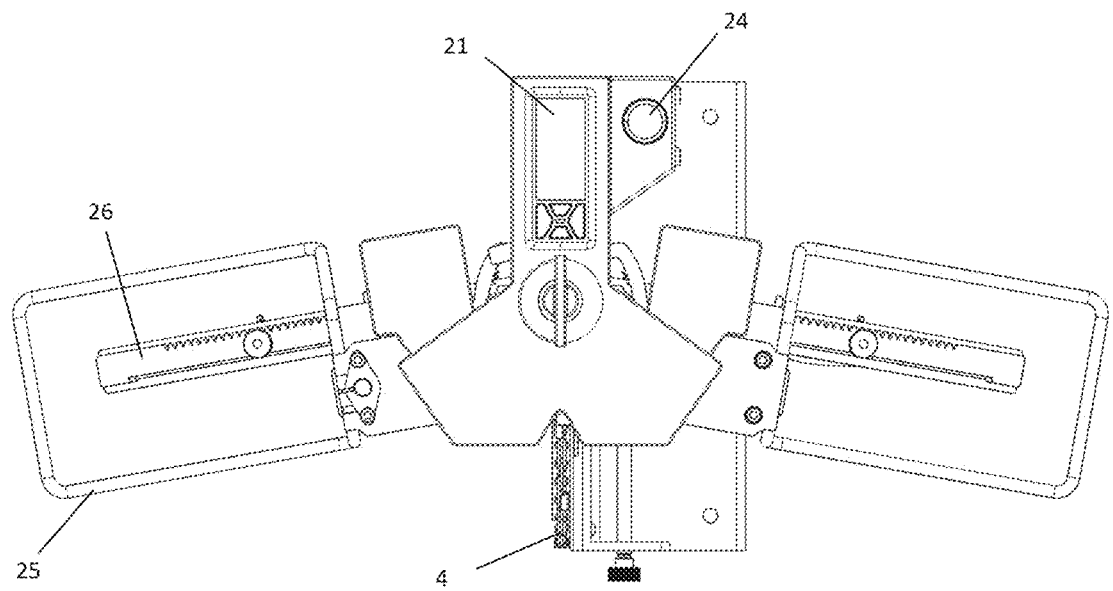
FIG. 3 represents a top view of the sharpener of FIG. 2 wherein pivotable supports carrying sharpening and planing means are symmetrically pivoted.

As illustrated in FIGS. 2 and 3, the sharpener has two pivotable arms about a geometric center, each arm carrying a file holder 26. The arms are arranged to pivot so that each file holder 26 can be disposed to sharpen and grind a chainsaw chain tooth at an angle comprised between 10° and 35° relative to the median plane of the chain. In this example, the arms are pivoted by means of a knurled wheel 34 arranged at the geometric pivot center of the arms. Each file holder 26 slides during sharpening and simultaneous planing of a chainsaw chain tooth. To avoid any risk for a user, each arm includes a security barrier 25 thus preventing the file holder 26 from coming into contact with a user. The rotation of the arms makes it possible to process different types of chainsaw chain teeth.

The sharpener includes a rest position (see FIG. 4) during which the file holders 26 are in a high position and a working position (see FIG. 5) during which the file holders 26 are in a low position and arranged to sharpen and grind chainsaw chain teeth.

Figure 4:
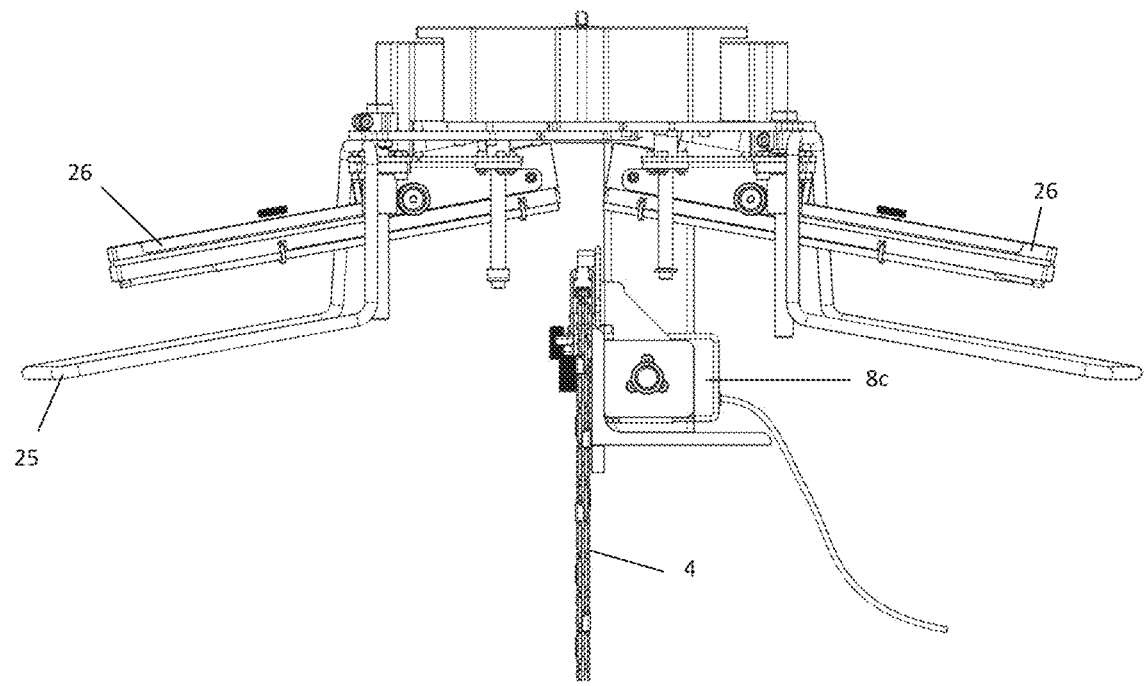
FIG. 4 represents a side view of a sharpener in the rest position.
Figure 5:
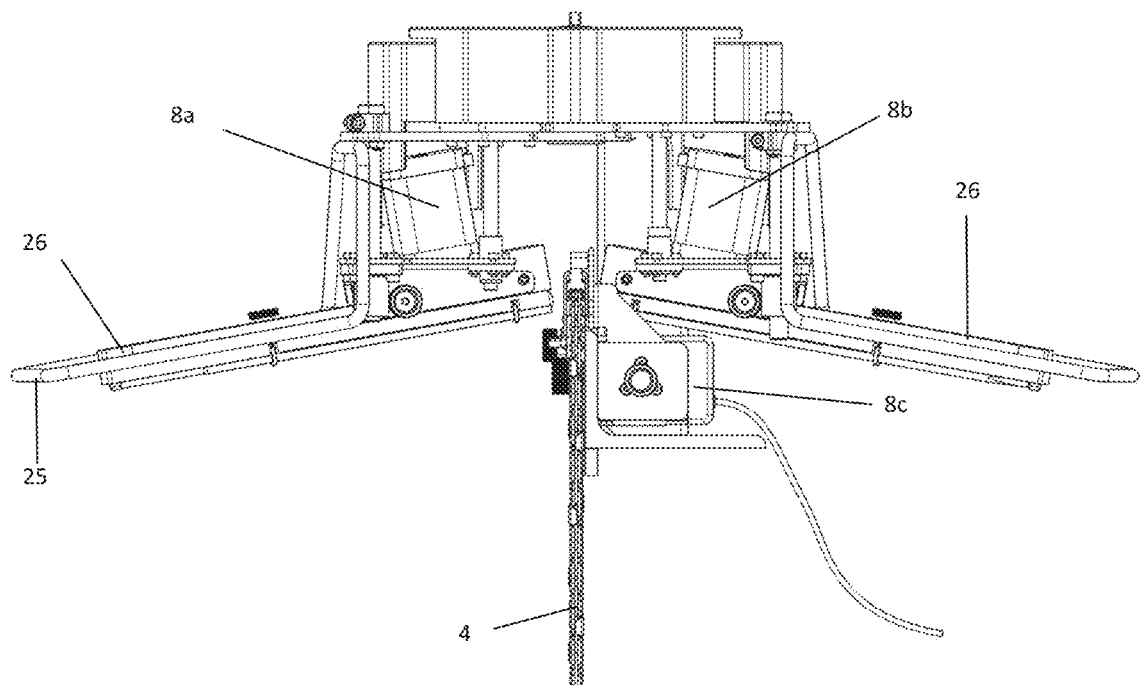
FIG. 5 represents the sharpener of FIG. 4 in the working position.
Figure 9:
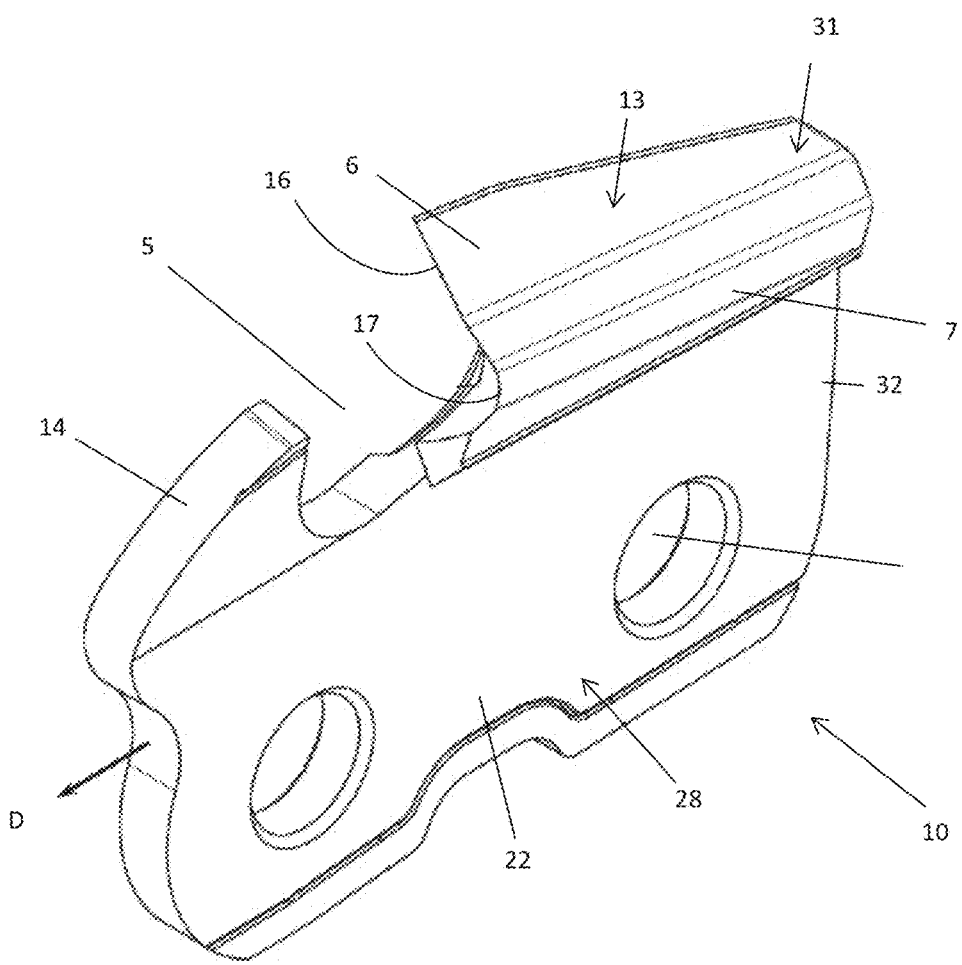
FIG. 9 represents a perspective view of a cutting tooth.

FIG. 4 represents a side view of a sharpener in a rest position;

FIG. 5 represents the sharpener of FIG. 4 in a working position;

FIG. 6 represents a perspective view of the sharpener according to the present invention;

FIG. 9 illustrates a cutting tooth 10 taking into account the fact that the cutting teeth may slightly differ from each other. Thus, the tooth illustrated in FIG. 9 is composed of a base body 22 with a cutting element 13 fixed to the base body 22. The base body 22 has an upper edge 31 and a lower base area 28. Prior to the cutting element 13, in the direction of movement D, a depth limiter 14 is provided on the base body 22. The cutting element 13 includes a gouge 6, a roof-shaped portion with a roof-shaped cutting ridge 16, and a lateral portion 7 with a lateral cutting ridge 17. The lateral portion 7 extends above a lateral surface 32 of the base body 22. The roof-shaped portion 6 extends from the upper edge 31 of the base body 22. There is a clearance recess 5 formed in the base body 22 between the lateral cutting ridge 17 and the depth limiter 14, for the removal of the chips, being specified that the cutting element 13 protrudes into the clearance recess 5, in the direction of movement D.

The sharpener illustrated in FIGS. 1 to 6 is arranged so that, during a linear and reciprocating movement, the sharpening means 9 exerts, in the direction of translation but in the opposite direction, a sharpening pressure on the cutting tooth 10, this sharpening pressure on the cutting tooth being provided at least by the drive means 8c. Still according to this example, the planing means 11 exerts, in the vertical direction, a planing pressure on the cutting tooth, this planing pressure being provided by a means 90a, 90b for vertically positioning the file holder 26. Thus, in this example, the sharpener includes a means for setting the intensity of the electric current flowing in a first electric motor contained in the drive means 8c and in a second electric motor contained in the positioning means 90a, 90b so as the sharpening pressure and the planing pressure are adjustable by said setting means. During sharpening, the sharpening pressure is decreased, and the planing pressure is decreased during a final period of the linear and reciprocating movement.

The automatic sharpener illustrated in FIG. 1 includes control means 20 arranged to select a pitch of teeth, a number of teeth, a profile of teeth, a function of sharpening and/or planing a chainsaw chain 4 of the aforementioned type. The sharpener 1 further includes a digital display, in particular an LCD display 21 for displaying the information of said control means 20. The sharpening angles must be respected and selectable by a user by manual setting. The user enters the parameters of the chain he wants to sharpen, for example the pitch of the chain with the following values ¼", 325", ⅜" and 404", the number of drive links, the periodicity of the teeth of the chain for example with the following values ½ or ⅓ links. The user can start/stop a sharpening cycle by pressing a Start/Stop 24 button. The LCD display 21 and a simple four-button interface (+, -, return, validate) make it possible to enter and inform the user on the parameters of the machine. The round chain files are used for the sharpening, different diameters being available for different types of chain.

Figure 7A:
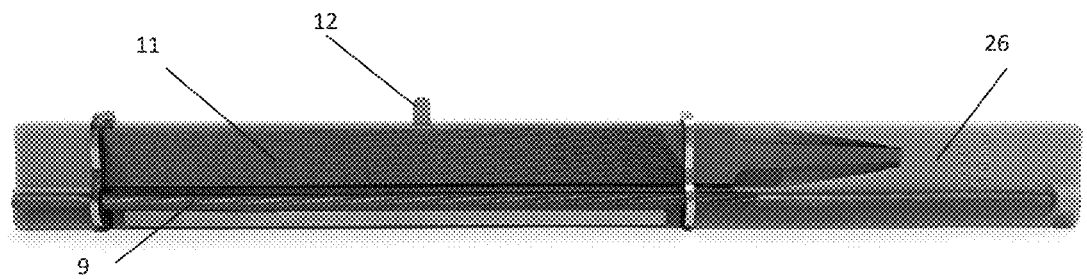
FIGS. 7A and 7B represent a top view of a file holder of the sharpener, one with the flat and round files and the other without the files.

The sharpening means 9 and the planing means 11 are arranged on a file holder 26 which moves in translation, guided by a file guide 27, by means of a rack system 29 driven by a stepper motor 8a, 8b (see FIG. 1 and FIG. 7A).

Figure 10:
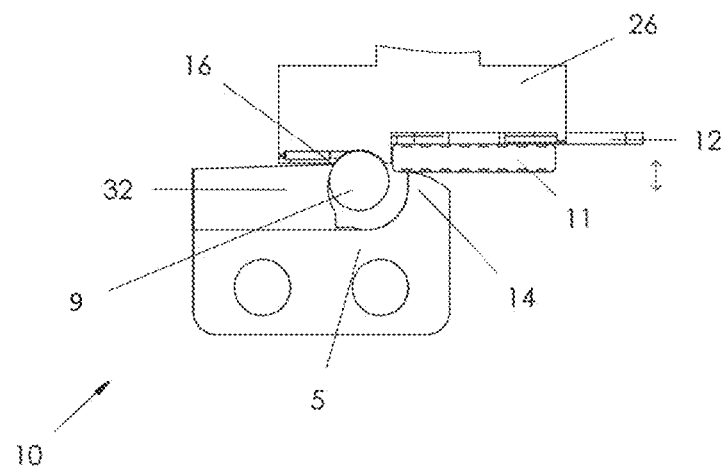
FIG. 10 represents a sectional view of sharpening and planing means sharpening a cutting tooth.

As illustrated in FIG. 10, the sharpener includes means 11 for planing a depth limiter 14 of a cutting tooth 10 of a chainsaw chain. The sharpening means include a removable round file 9. The planing means include a removable flat file 11. The sharpening means 9 are arranged to sharpen each cutting tooth 10, said means moving in translation parallel to a cutting ridge 16 through a clearance recess 5 of a cutting tooth 10, said sharpening means 9 being angularly positioned at a lateral surface 32 of a cutting tooth 10. The file holder 26 comprises a means 12 for adjusting the vertical distance between the axis of the round file 9 and the main plane of the flat file 11. The file holder 26 also includes blocking elements 33 for holding in position the flat file 11 and the round file 9

Figure 7B:
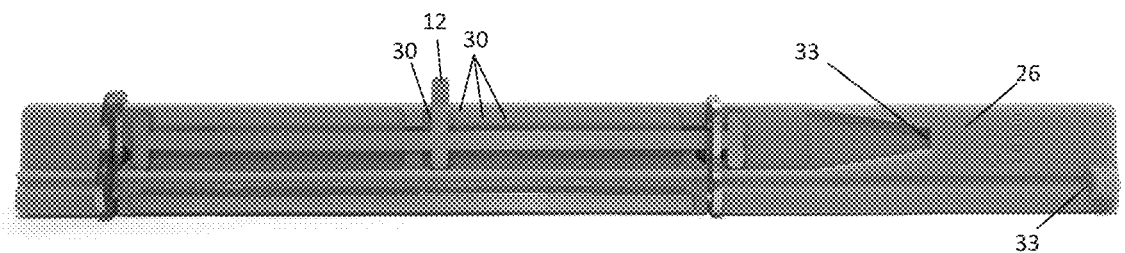
Figure 8:
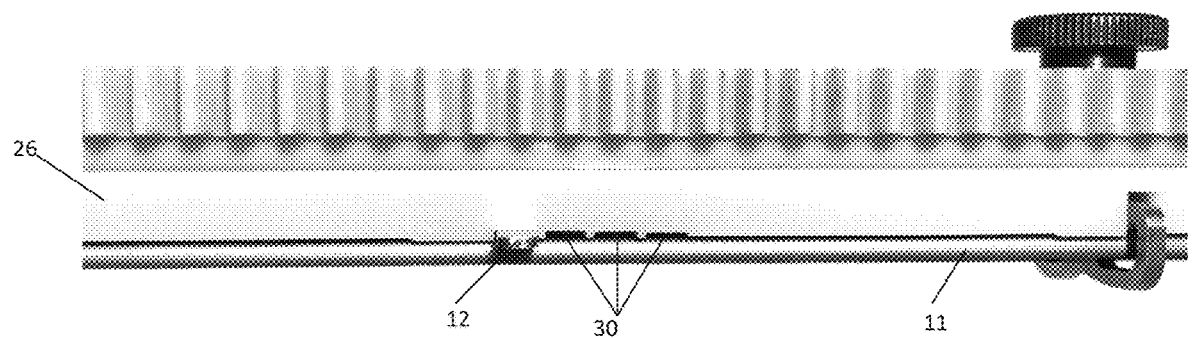
FIG. 8 represents a partial side view of the file holder of FIG. 7A wherein the vertical distance between the axis of the round file and the main plane of the flat file is at a minimum.

As illustrated in FIG. 7B and in FIG. 8, the file holder 26 includes grooves 30 parallel to one another in order to maintain the adjustment means 12 in position. In the position illustrated in FIG. 8, the adjustment means 12 is arranged so that the vertical distance between the axis of the round file and the main plane of the flat file 11 is as small as possible. The more the adjustment means 12 on the grooves 30 is shifted to the right, the greater the vertical distance between the axis of the round file and the main plane of the flat file 11.

Figure 11:
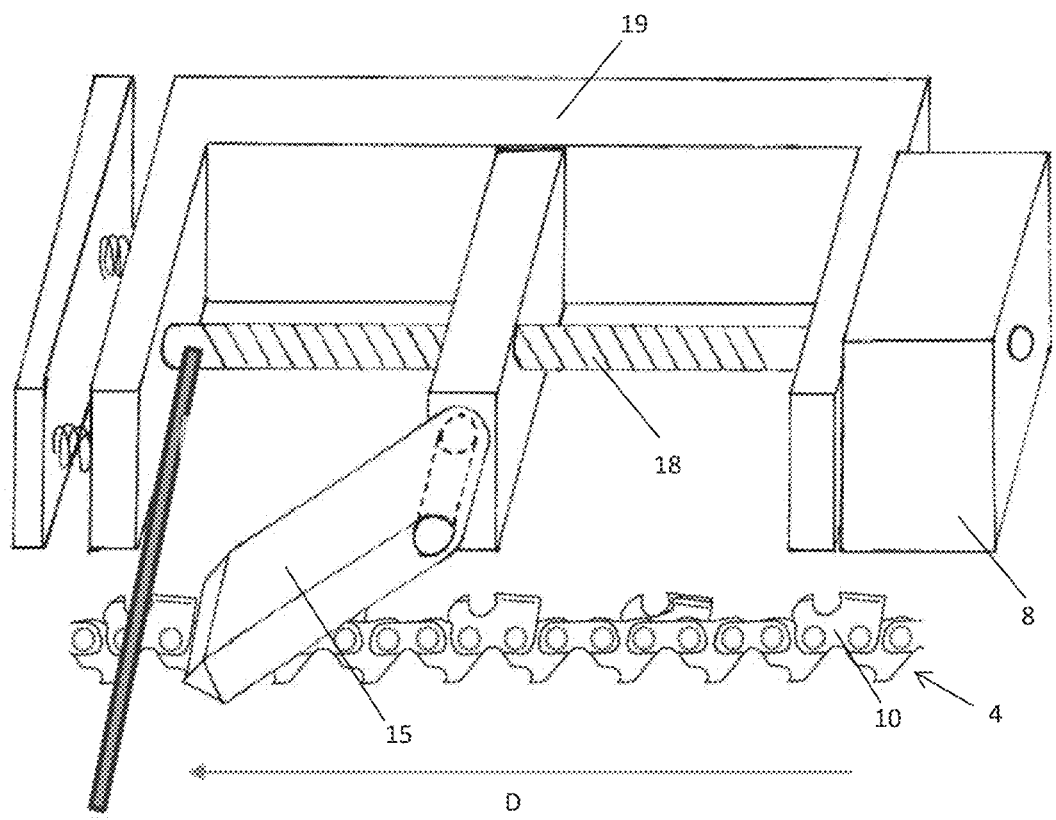
FIG. 11 represents a perspective view of means for holding a chainsaw chain during a sharpening operation.

As illustrated in FIG. 11, the holding means 19 are arranged to hold a chainsaw chain 4 during sharpening and planing operations, said holding means 19 including in particular a stop finger 15. The stop finger 15 pivots, at one of its ends, about an axis and rises when the chain 4 progresses to be positioned on the rear portion of the next cutting tooth which is then blocked by the end of the stop finger 15. The chain is driven in a direction of movement D. It is held firmly in position during a grinding operation. In this example, the stop finger 15 on a worm screw 18 allows said stop finger 15 to block the chainsaw chain 4 during its grinding.

In the example illustrated in FIG. 1, the sharpener includes detection means 23, in particular sensors, for detecting the wear of a cutting tooth of a chainsaw chain 4. The detection means 23 are arranged to detect a roof-shaped portion of a smallest cutting tooth in height so as to determine a reference point for uniformly sharpening all the other roof-shaped portions of the cutting teeth of a chainsaw chain 4. As the gouge is sharpened, the depth limiter 14 (FIG. 9) must be planed to keep the same cutting depth, thus ensuring the high performance of the chain.

The sharpener illustrated is arranged to be battery operable. The electronic card will operate with a regulated voltage of 12 VDC or 24 VDC so that it can be connected for example to a cigar-lighter of a vehicle. In another version, the sharpener can be arranged to be mains-operated. Depending on the country, this mains voltage may vary for example from 220/230 VAC or 110/120 VAC at frequencies of 50 Hz or 60 Hz.

The sharpener includes removable files that a user can change by himself/herself if needed.

Figure 12:
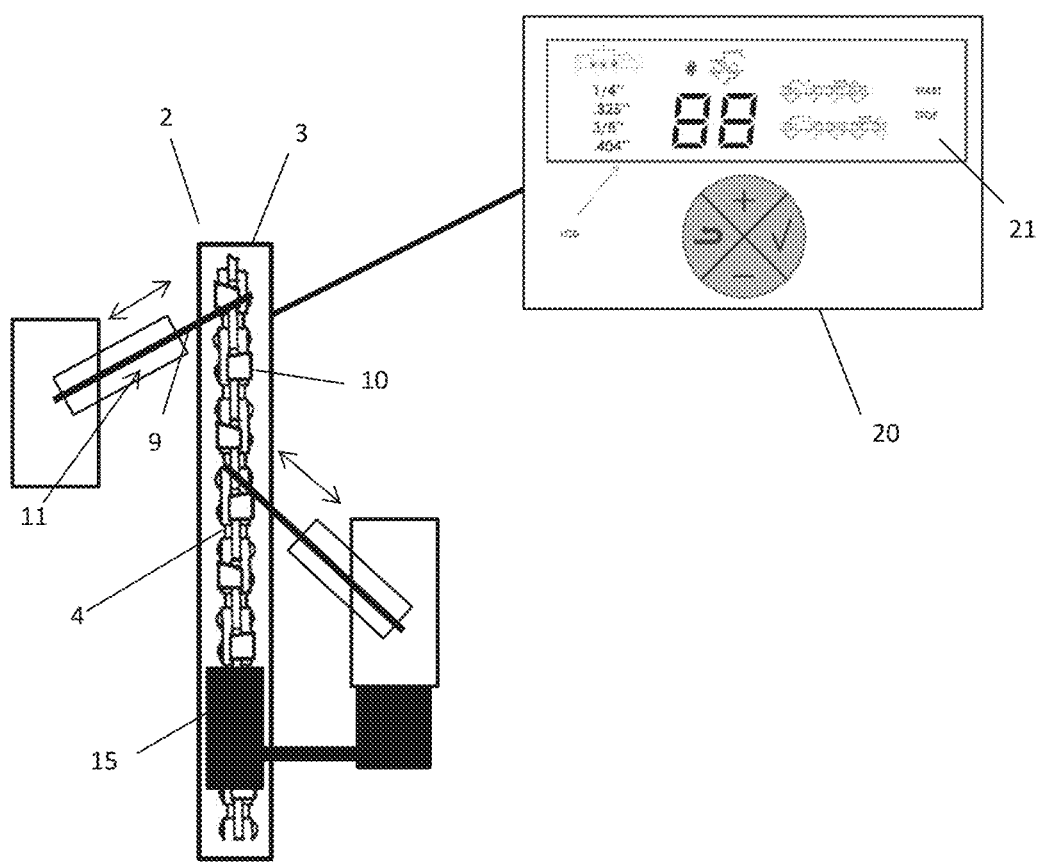
FIG. 12 represents a top view of an automatic sharpener.

As illustrated in FIG. 12, the sharpening 9 and planing 11 means are split and disposed on either side of the chain support 3, so as to act concomitantly on a left cutting tooth and a right cutting tooth of a chainsaw chain of the type with alternating links. Thus, the automatic sharpener 1 for cutting teeth 10 of a chainsaw chain 4 includes an accommodation area 2 comprising a chain support 3 receiving a chainsaw chain 4. A drive means allows the automatically forward-regulated and stepwise-regulated supply of the chainsaw chain 4 received in the accommodation area 2. The sharpening means 9 are arranged to sharpen the cutting teeth 10 of the chainsaw chain 4 during its progress according to different sharpening angles. The sharpening means 9 are arranged to alternately sharpen a right cutting tooth 10 and a left cutting tooth 10 offset longitudinally with respect to each other and at different sharpening angles.

FIG. 12 illustrates an automatic sharpener 1 for cutting teeth of a chainsaw chain 4 of the type including links and left and right cutting teeth. The left and right cutting teeth are symmetrical and longitudinally offset with respect to each other.

For time-saving and minimum handling purposes, the sharpening 9 and planing 11 means are mounted on a pivotable support (or arm) between two symmetrical positions, so as to act successively on all left cutting teeth and all right cutting teeth of a chainsaw chain of the type with alternating links, without having to return the chain in its chain support 3.

The sharpener according to the present invention thus makes it possible to "cold"-grind the left cutting teeth and the right cutting teeth longitudinally offset with respect to each other and at different sharpening angles. The use of round files and optionally flat files provides better comfort and better accuracy of work by preventing in particular the risks associated with the use of abrasive discs, such as for example the projection of chips.

The automatic sharpener of the present invention can advantageously be delivered as a kit in a cardboard box weighing less than 20 kg. Once the sharpener is assembled, its low weight allows it to be easily transportable and fixable on a working support in less than a minute. The sharpener is in this example of small size in particular with a height of less than 26 cm, a depth of less than 35 cm and a width of less than 35 cm.

In addition, the settings/parameterizations are very easy to manage from the screen display.

The portable automatic sharpener also has the advantage of working autonomously, once the settings have been made, without the need for the supervision of a user.

The invention claimed is:

1. An automatic sharpener for cutting teeth of a chainsaw chain including links and cutting teeth having a depth limiter, the sharpener comprising: an accommodation area comprising a chain support able to receive the chainsaw chain, a longitudinal axis of the accommodation area defining a first horizontal direction, a median plane of the chain parallel to lateral surfaces of the links defining a vertical plane, a drive means for a preferably automatically forward-regulated and stepwise-regulated horizontal translation of said chainsaw chain received in the accommodation area, a sharpening means arranged to sharpen the cutting teeth at different sharpening angles, after each translation of the chainsaw chain, and a means for planning the depth limiter of a cutting tooth, the planning means and the sharpening means respectively comprising a flat file and a round file removable fixed in a file holder, wherein, the sharpening means and the planning means are arranged to simultaneously sharpen and plane the same cutting tooth in a linear and reciprocating movement of the file holder in a plane comprised between +/−10 relative to the first horizontal direction, and the automatic sharpener further includes a means for vertically positioning the file holder arranged to exert, in the vertical direction, a planing pressure of the flat file on the cutting tooth during the linear and reciprocating movement of the flat file simultaneously with the linear and reciprocating movement of the round file.

2. The automatic sharpener according to claim 1, wherein the file holder comprises a means for adjusting the vertical distance between the axis of the round file and the main plane of the flat file.

3. The automatic sharpener according to claim 1, wherein said vertical positioning means contains an electric motor and is arranged to adjust the planing pressure according to the intensity of the electric current flowing in this electric motor.

4. The automatic sharpener according to claim 1, wherein the means for vertically positioning the file holder is arranged to exert a planing pressure which is decreased at least during a final period of linear and reciprocating movement.

5. The automatic sharpener according to claim 1, wherein said horizontal positioning means contains an electric motor and is arranged to adjust a sharpening pressure on the round file according to the intensity of the electric current flowing in the electric motor.

6. The automatic sharpener according to claim 5, wherein the means for horizontally positioning the file holder is arranged to exert a sharpening pressure which is decreased at least during a final period of linear and reciprocating movement.

7. The automatic sharpener according to claim 1, wherein the file holder is arranged to move in translation at a leading angle comprised between +/−10 degrees relative to the first horizontal direction.

8. The automatic sharpener according to claim 7, wherein the leading angle is at least of +/−1 degree.

9. The automatic sharpener according to claim 1, including a means for adjusting the file holder, arranged to be positioned in grooves disposed in parallel on the file holder, each groove being of different depth each corresponding to a determined value of the vertical distance between the axis of the round file and the main plane of the flat file.

10. The automatic sharpener according to claim 1, including holding means arranged to hold a chainsaw chain during sharpening and planing operations, said holding means including a stop finger.

11. The automatic sharpener according to claim 1, including a file guide which guides the file holder in translation by means of a rack system driven by a stepper motor.

12. The automatic sharpener according to claim 1, including control means arranged to select a pitch of teeth, a number of teeth, a profile of teeth, a function of sharpening a cutting tooth and a function of planing a depth limiter of a cutting tooth of a chainsaw chain, the sharpener further including a digital display, in particular an LCD display for displaying the information of said control means.

13. The automatic sharpener according to claim 1, wherein the sharpening and planing means are split and disposed on either side of the chain support, so as to act concomitantly or successively on a left cutting tooth and a right cutting tooth of a chainsaw chain of the type with alternating links.

14. The automatic sharpener according to claim 1, wherein the sharpening and planing means are mounted on a pivotable support system between two symmetrical positions, so as to act successively on all left cutting teeth and all right cutting teeth of a chainsaw chain of the type with alternating links, without having to return the chain in its chain support.

15. The automatic sharpener according to claim 1, for sharpening a chain including cutting teeth provided with a roof-shaped portion, the sharpener including detection means arranged to detect said roof-shaped portion with the smallest height so as to determine a reference point for uniformly sharpening all the other roof-shaped portions of the cutting teeth of a chainsaw chain.

16. The automatic sharpener according to claim 1, including detection means, in particular sensors, for detecting a cutting tooth of greater wear.

\* \* \* \* \*

UNITED STATES PATENT AND TRADEMARK OFFICE
CERTIFICATE OF CORRECTION

PATENT NO. : 10,758,991 B2
APPLICATION NO. : 16/469295
DATED : September 1, 2020
INVENTOR(S) : Claude Currat et al.

It is certified that error appears in the above-identified patent and that said Letters Patent is hereby corrected as shown below:

In the Claims

In Column 7, Lines 48, 49, 52 and 58, please amend Claim 1 by replacing the word "planning" with "planing".

Signed and Sealed this
Twenty-fourth Day of November, 2020

Andrei Iancu
*Director of the United States Patent and Trademark Office*